UNITED STATES PATENT OFFICE.

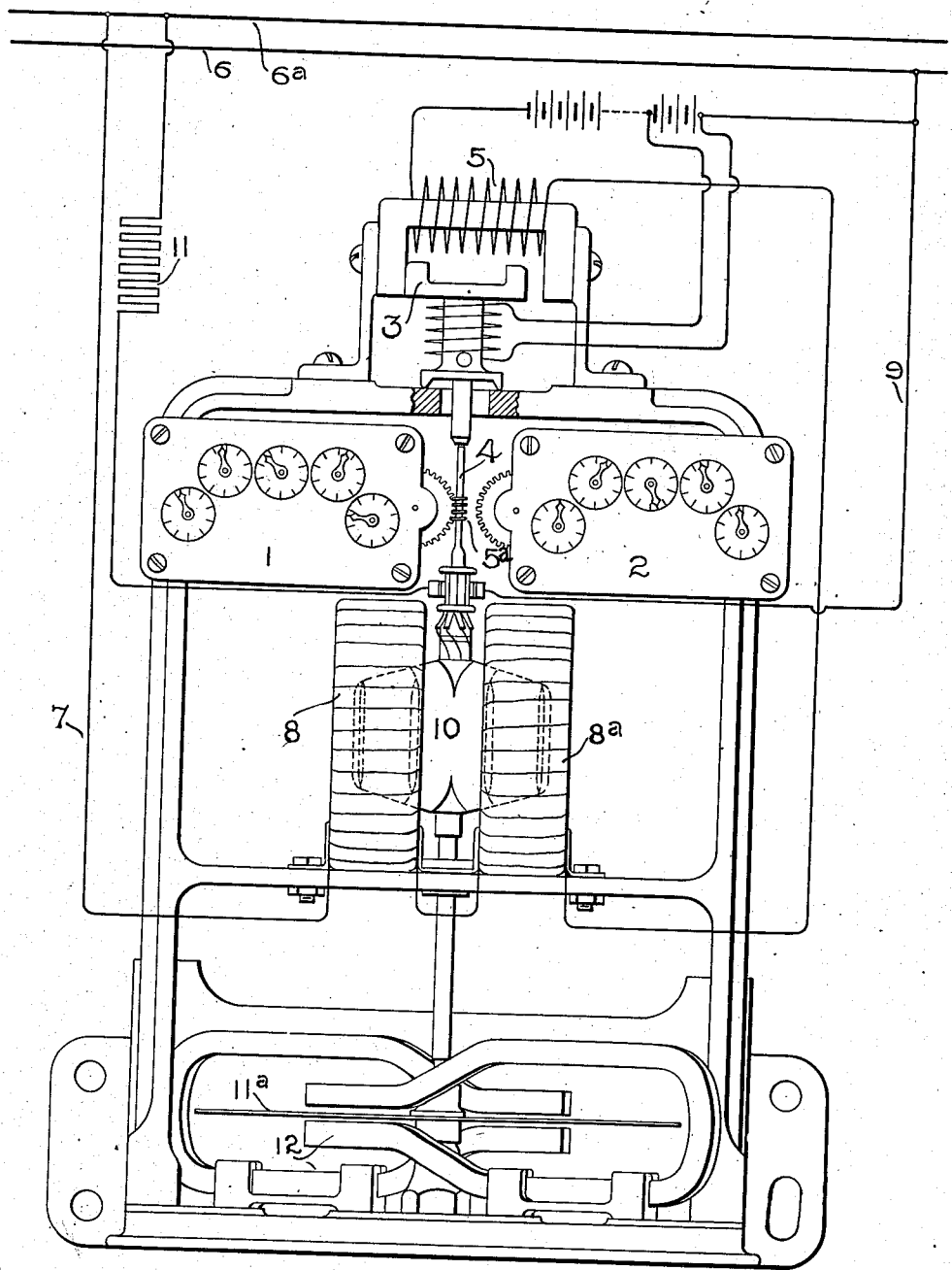

CARYL D. HASKINS, OF NEWTON, MASSACHUSETTS, ASSIGNOR TO THE GENERAL ELECTRIC COMPANY, OF NEW YORK.

ELECTRIC METER.

SPECIFICATION forming part of Letters Patent No. 664,948, dated January 1, 1901.

Application filed July 29, 1899. Serial No. 725,445. (No model.)

*To all whom it may concern:*

Be it known that I, CARYL D. HASKINS, a citizen of the United States, residing at Newton, county of Middlesex, State of Massachusetts, have invented certain new and useful Improvements in Electric Meters, (Case No. 1,100,) of which the following is a specification.

In the operation of storage batteries it is desirable to provide some indicator or registering device which will register the intake and output of energy. Such a device is serviceable not only for indicating during a protracted period of service the amount of energy put through the battery and the extent of use to which it has been put, but is of value also for indicating the condition of charge in the battery during a single run and showing how much further energy may be safely drawn from it, thereby conserving the life of the battery by preventing excessive charge or discharge. I provide a meter for accomplishing these results.

In carrying out my invention I provide a device responsive to change of current direction for cutting in or out either of two registering devices, accordingly as the battery is charging or discharging. This device consists of a magnetically-controlled clutch, one member of which is of constant polarity and the other member of which reverses when the battery begins to discharge. I preferably operate these devices mechanically by an electromotor, which may be thrown by the circuit-changer into or out of operative relation to the several dials.

My invention therefore comprises a storage-battery meter provided with two registering devices controlled by a magnetically-operated clutch, one member of which is of continuous polarity and the other member of which may be reversed when the battery begins to discharge.

It embodies also other features, the novelty of which will be hereinafter more fully set forth.

Other more specific features will hereinafter be specifically indicated in the claims.

In the drawing which embodies my improvements I have exemplified as the type of meter, so far as the motive mechanism is concerned, the well-known Thomson recording-wattmeter. It is not, however, essential to my invention that any specific type of operating mechanism for the meter be employed, as will be hereinafter more evident.

The movable or rotary portion of the meter is provided with a device adapted to engage either of two registering-trains 1 2 and may be shifted into operative relation to either by an electromagnetic device controlled by reversal of the current. As specifically shown, a movable armature 3, adapted to slide or move in guides on the top of the frame supporting the meter parts, shifts the armature-shaft 4 so as to bring the worm $5^a$ into gear with one or the other of the dial-wheel trains. The armature is polarized by a shunt-circuit from two or more cells of the storage battery and plays in a magnetic field controlled by the coil 5, connected in series relation to the battery. Thus upon reversal of the battery-current on beginning to discharge the polarity of the field-magnet, which is in series with the cells of the battery, reverses and the position of the armature is shifted, thereby shifting the clutch from the train of wheelwork last engaged to the other train. The motive mechanism of the meter in the organization shown comprises a shunt-circuit in fixed relation to the charging-mains 6 $6^a$, which may be traced as follows: proceeding from the main 6 through the storage battery in series, through the series coil 5 of the clutch-controlling device, through the series coils 8 $8^a$ of the meter-motor, and back by the conductor 7 to the opposite charging-main $6^a$. The shunt-circuit of the motive mechanism leads from the main 6 by conductor 9 to the armature 10 of the motive mechanism and thence by a fixed resistance 11 to the main $6^a$. The speed of the motor may be dampened by a conducting-disk $11^a$, moving in the field of a permanent magnet 12 in a manner commonly practiced in the construction of electric meters.

Assuming that the polarity while the battery is charging is such as to hold the registering-train 1 in operative relation to the worm $5^a$, when the period of discharge of the battery begins the current through the coil 5 reverses, thereby reversing the sign of its poles and shifting the armature 3, which is controlled by a shunt from two or more cells of the battery and has therefore a constant polarization. As this armature rests upon the top of the meter-frame and has a stem extending through an opening in the same, which has a socket at its tip for receiving the end of the armature-shaft 4, but a small play is necessary to shift the worm from clutching relation to either wheel-train. No special provision as to the mounting of the armature is therefore necessary, except that it should be so arranged as to be capable of turning with relation to the stem of the armature 3 and should move with it when the latter is shifted to the right and carry with it the stem 4, which carries the worm, thus throwing into gear with the armature 10 the dial 2. The indication on the several dials will thus show at any time the amount of charge and discharge of the battery, or if adjusted at the start of a run will at the finish of said run indicate the amount of current put into the battery and the amount of energy still available therein.

It will be seen that the essential feature is the relay organization 3 and 5, by which one or the other metering device is put into action, and that the only prerequisite so far as the latter devices are concerned is that they shall be capable in any manner—electromechanical, electrochemical, electrothermal, or otherwise—of operating the dial-registers.

What I claim as new, and desire to secure by Letters Patent of the United States, is—

1. A meter comprising two registers, a meter-motor responsive to the current to be measured, a clutch to couple the motor to either register, and a polarized controlling device for the clutch having one member of continuous polarity and the other member in circuit with the storage battery the energy of which is to be measured by the meter.

2. A storage-battery meter, comprising two registers, a meter-motor responsive to the current to be measured, a clutch to couple the motor to either register, and a polarized controlling device for the clutch, having one member continuously polarized by a shunt from the battery, and the other connected to reverse with the discharge of the battery.

3. A meter comprising two registers, a meter-motor responsive to the current to be measured, provided with a movable armature to gear with either register, and means for shifting the armature into gear with either register.

4. A storage-battery meter comprising two meter-registers, a motor operated by the battery-current at varying speeds according to the strength of current, a clutch and an electromagnetic device responsive to change of direction of the battery-current to engage the motor with either register and disengage it from the other.

5. A storage-battery meter comprising two registers, a meter-motor including on one of its members a coil in series with the battery, a magnetically-operated clutch, one of the operating members being of constant polarity, and the other polarized by a coil in series with the battery-circuit, said clutch being adapted to couple the motor to either register.

6. A storage-battery meter comprising two registers, a meter-motor governed by the battery-circuit, a worm on the movable member thereof, and a magnetically-operated clutch having one operating member of constant polarity, and the other magnetized by a coil in series with the battery to shift the worm into engagement with either register.

In witness whereof I have hereunto set my hand this 27th day of July, 1899.

CARYL D. HASKINS.

Witnesses:
BENJAMIN B. HULL,
MABEL E. JACOBSON.